US005369326A

United States Patent [19]

Strobl

[11] Patent Number: 5,369,326

[45] Date of Patent: Nov. 29, 1994

[54] CYLINDRICAL CARBON SEGMENT COMMUTATOR

[75] Inventor: Georg Strobl, Repulse Bay Garden, Hong Kong

[73] Assignee: Johnson Electric S.A., Switzerland

[21] Appl. No.: 931,685

[22] Filed: Aug. 18, 1992

[30] Foreign Application Priority Data

Aug. 22, 1991 [GB] United Kingdom ................. 9118086

[51] Int. Cl.[5] ........................................ H02K 13/04

[52] U.S. Cl. .................................. 310/235; 310/233; 310/234; 310/236

[58] Field of Search ............... 310/233, 234, 235, 236, 310/44; 29/597

[56] References Cited

U.S. PATENT DOCUMENTS

| | | | |
|---|---|---|---|
| 3,473,062 | 10/1969 | Forste | 310/234 |
| 3,473,063 | 10/1969 | Forste | 310/234 |
| 3,777,367 | 12/1973 | Kalagidis | 310/233 |
| 4,349,384 | 9/1982 | Weinert | 310/233 |
| 4,769,627 | 9/1988 | Baines | 310/234 |
| 4,876,474 | 10/1989 | Wang | 310/236 |
| 4,975,612 | 12/1990 | Strobl | 310/234 |
| 5,008,577 | 4/1991 | Wang | 310/233 |

FOREIGN PATENT DOCUMENTS

| | | |
|---|---|---|
| 8908077.7 | 11/1989 | Germany . |
| 8907045 | 12/1989 | Germany . |
| 9006538.7 | 8/1990 | Germany . |
| 9006782.7 | 8/1990 | Germany . |
| 1170317 | 11/1969 | United Kingdom . |

*Primary Examiner*—R. Skudy

*Attorney, Agent, or Firm*—Ostrolenk, Faber, Gerb & Soffen

[57] ABSTRACT

Carbon commutator segments are secured to a base member by means of integral anchor pieces disposed within axially extending, cruciform-section slots formed in the outer cylindrical surface of an insulating base member. Elongate contact members having lateral edges seated in lateral parts of the slots are embedded in the anchor pieces and are each provided, at one end, with a terminal for connection to an armature winding lead wire. The carbon segments and the integral anchor pieces are formed by enclosing the base member, together with assembled contact members, in a mould and then injecting a mouldable mixture of carbon powder and carrier material into space between the mould and the assembly. When the injection moulded layer has solidified, an annular-section outer portion of this injection moulded layer is divided into segments by means of axially-extending radial cuts. Holes, formed in a central part of each contact member, facilitate the flow of mouldable mixture and ensure that the mouldable mixture fills that part of each slot which is not occupied by the contact member disposed within slot.

10 Claims, 4 Drawing Sheets

CYLINDRICAL CARBON SEGMENT COMMUTATOR

FIELD OF THE INVENTION

The invention relates to a cylindrical carbon segment commutator for use in an electrically-driven fuel pump unit which is immersed in liquid fuel.

BACKGROUND ART

According to current practice, fuel-injected internal combustion engines are supplied with fuel by means electrically-driven fuel pump units disposed within the fuel tanks of these engines and immersed in fuel. Electric motors forming parts of these units normally utilize conventional copper commutators. However, wear these copper commutators is surprisingly heavy. This wear, it is thought, arises from the combined effects abrasion by the carbon brushes engaging the commutator and electrolytic erosion resulting from the small but common water content of commercially available fuels. These two influences appear to operate synergistically. It therefore seems desirable to replace copper commutators with non-metallic commutators which are not subject to the same degree of electrolytic erosion when immersed in fuel contaminated with water.

One known planar carbon segment commutator, disclosed in the specification of German utility model G 89 07 045.3, in the joint names of Deutsche Carbone AG and Robert Bosch GmbH, comprises an insulating support member having a circular face, copper contact members mounted on the circular face of the support member, and a carbon layer provided outside each contact member by injection moulding a mixture of carbon powder and carrier material.

An outer rim on each contact member supports the carbon layer mounted on the contact member against centrifugal force and, to support the carbon layers against axial displacement, each layer is formed integral with at least one axially extending anchor piece, during the injection moulding process, after providing axially extending holes in the support member and/or the contact members for receiving the injection moulded mixture. These anchor pieces need not be very strong to prevent axial removal of the carbon layers because there is little axial loading on the carbon layers urging them away from the contact members. The brushes engaging the commutator actually assist the anchor pieces by pressing the carbon layers against the contact members and the support member.

One known cylindrical carbon segment commutator comprises a base member of insulating material, such as liquid crystal polymer or phenolic resin, having an axially extending outer surface; a plurality of elongate axially extending contact members; and a plurality of carbon segments respectively connected to the contact members and held in fixed relation to the base member.

In this known construction, the contact members comprise copper segments and the carbon segments have metal coated inner surfaces which are soldered to the copper segments constituting the contact members.

Construction of carbon segment commutators such as this involves the costly and time consuming steps of electroplating, or otherwise coating, the inner surfaces of the carbon segments with a highly conductive metal, such as copper, and then soldering the metal-plated surfaces of the carbon segments to the copper segments.

DISCLOSURE OF INVENTION

The purpose of the present invention is to simplify and reduce the assembly cost of cylindrical carbon segment commutators.

This is achieved by ensuring that a plurality of axially-extending, internally-shouldered or internally divergent slots are formed in the outer surface of the base member; each slot has a necked or narrower portion and, radially inwards of the necked or narrower portion, a shouldered or broader portion of greater circumferential extent than the necked or narrower portion; the contact members are respectively disposed within the slots; and the carbon segments are overmoulded segments formed integral with anchor pieces which are respectively disposed within the slots and fill those parts of the slots which are not occupied by the contact members disposed within the slots.

Thus, according to the invention, there is provided a cylindrical carbon segment commutator, for an electric motor, comprising a base member, of insulating material, having an axially extending outer surface and a plurality of axially-extending, slots which each have a necked or narrower portion and, radially inwards of the necked or narrower portion, a shouldered or broader portion of greater circumferential extent than the necked a narrower portion, formed in the outer surface of the base member; a plurality of contact members respectively disposed within the slots; and a plurality of overmoulded carbon segments formed integral with anchor pieces which are respectively disposed within the slots and fill those parts of the slots which are not occupied by the contact members disposed within the slots to thereby connect the carbon segments to the contact members and hold the carbon segments in fixed relation to the base member.

With this construction, the shouldered or broader portion of each slot may have two internal shoulders disposed opposite sides of the radial axis of the slot and so, even if the contact member in each slot is narrower than the necked or narrower portion of the slot, the contact member, the carbon segment and its integral anchor piece are held in place, against centrifugal force by engagement of the anchor piece with the internal shoulders of the slot. However, if each contact member has two lateral edge parts and a central part, between the lateral edge parts, formed with at least one hole, the contact member may be respectively disposed within the shouldered or broader portions of the slots with the two lateral edge parts of each contact member in radial abutment with the two internal shoulders of the slot in which the contact member is disposed. This provides direct support for the contact members against centrifugal force. In this case, the two internal shoulders preferably comprise radially inwardly facing abutments, perpendicular to the radial axis of the slot.

In a preferred embodiment, the internally-shouldered slots are cruciform-section slots, and each slot has two lateral portions which respectively accommodate the lateral edge portions of the contact member disposed within the slot to thereby radially locate the contact member. This helps to maintain the contact member in its correct position during overmoulding of the carbon layer.

One end of each contact member may be provided with a terminal for connection to an armature winding lead wire.

Each slot preferably has one end which is longitudinally adjacent one end of each other slot. The base member may then be provided with an annular radial extension at least at said one end of each slot, which is formed with coaxially extending apertures, respectively aligned with the slots formed in the axially extending outer surface of the base member. In this case, the contact members disposed in the slots may extend through the apertures. This provides additional support against radial displacement of the contact members and the overmoulded carbon segments as a result of centrifugal force.

In a preferred embodiment of the invention, one end of each contact member extends through one of the apertures in such an annular radial extension and is provided with a terminal for connection to an armature winding lead wire.

The layer of carbon is preferably overmoulded on the outer surface of the base member by fitting a circular section mould around the base member and injecting a mouldable mixture of carbon powder and carrier material into the space between the mould and the base member. This injection moulding technique ensures that the mouldable mixture fills that part of each cruciform-section slot which is not occupied by the contact member disposed within the slot and is forced through any holes formed in the contact members. Any known carrier material, such as phenolic resin, may be used with the carbon powder to form the mouldable mixture for injection moulding, but the choice of carrier material and any subsequent heat treatment will depend on the operating requirements of different commutators, in accordance with known technology which forms no part of the present invention.

Where each slot has one end which is longitudinally adjacent one end of each other slot and the base member is provided with an annular radial extension at said one end of each slot, the annular radial extension may be provided with an axial projection having a cylindrical outer surface for sealing engagement with the circular section mould.

Sealing means may also be provided to seal between the apertures formed in this annular radial extension and the ends of the contact members which extend through these apertures to thereby prevent mouldable material which is injected into the space between the mould and the base member from flowing through the apertures.

Two embodiments of the invention are hereinafter described, by way of example, with reference to the accompanying drawings.

BEST MODES FOR CARRYING OUT THE INVENTION

Figure 1:
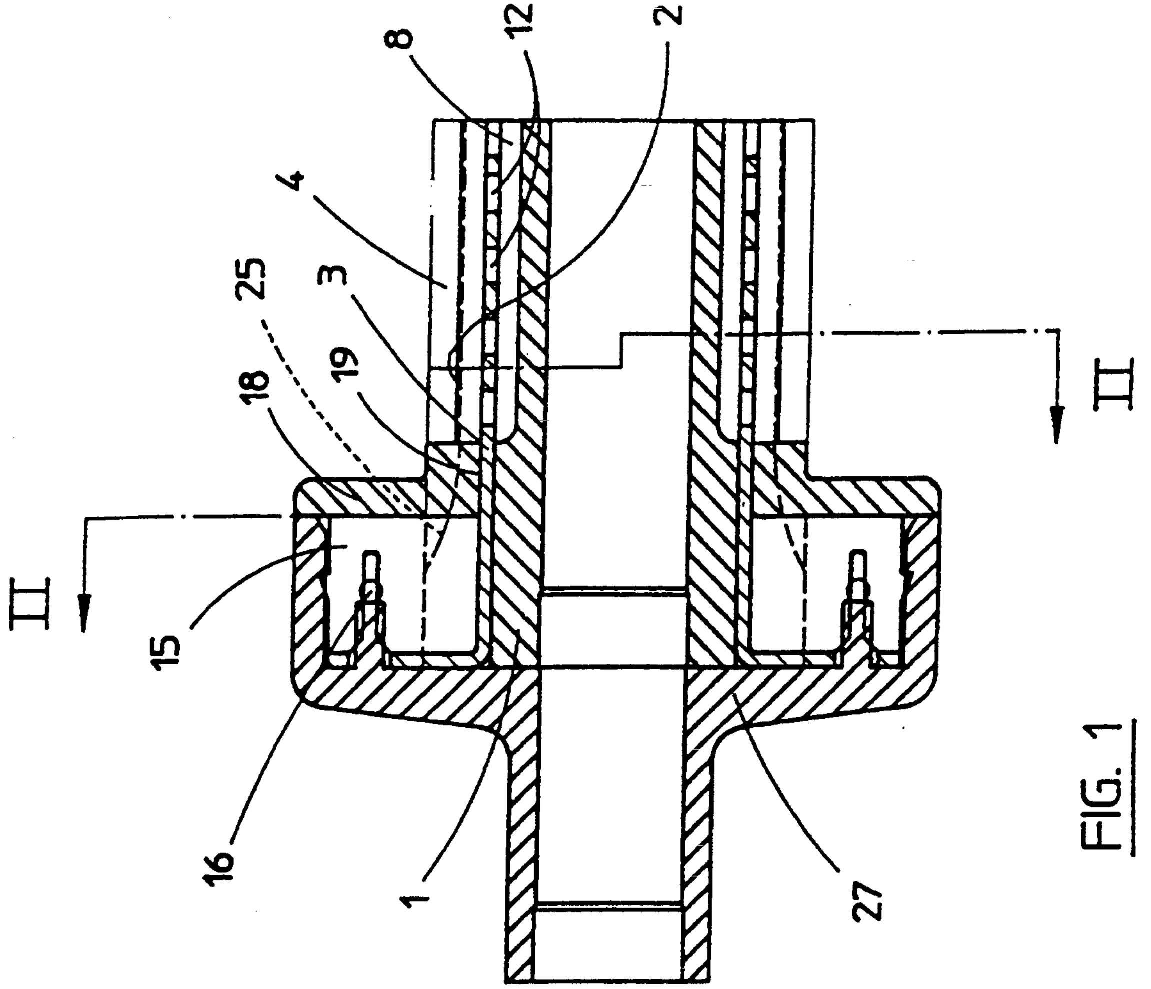
FIG. 1 is a sectional side elevation of a first cylindrical carbon segment commutator according to the invention, together with a terminal cover.
Figure 2:
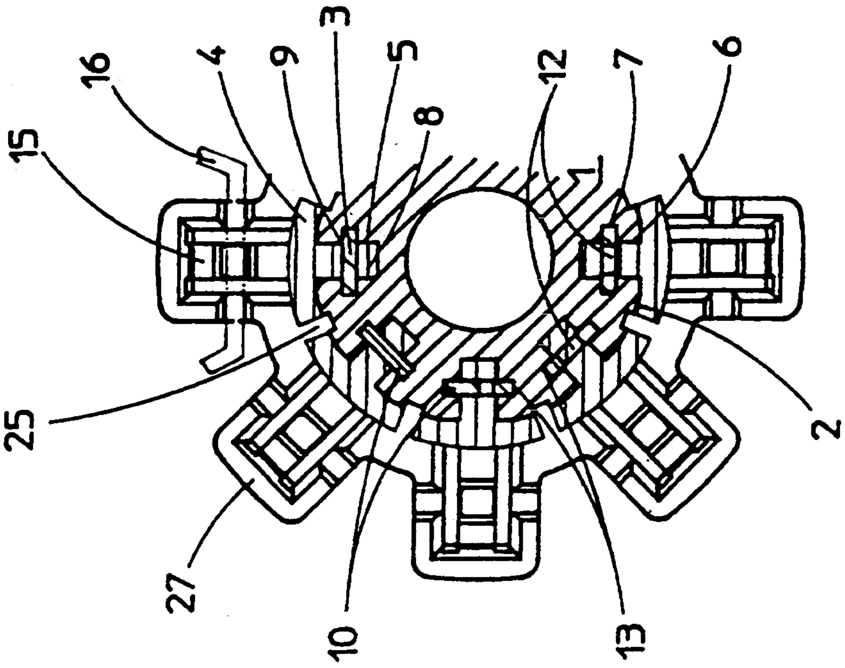
FIG. 2 is fragmentary sectional elevation of the assembly shown in FIG. 1, taken across the Section II—II in FIG. 1.
Figure 3:
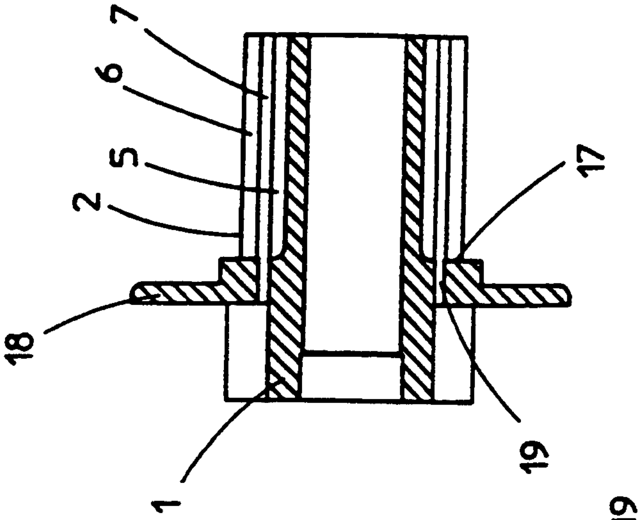
FIG. 3 is a sectional side elevation of a base member forming part of the commutator shown in FIGS. 1 and 2.

As shown in FIGS. 1, 2 and 3, a cylindrical carbon segment commutator comprises a base member 1 having an axially extending outer surface 2. Internally shouldered slots 5 are formed in the outer surface 2 and extend along radial axes as well as axially along longitudinal axes to accommodate contact members 3 which extend through apertures 19 in an annular radial extension 18 of the base member 1 at one end 17 of each slot 5 and are provided with terminals 15 which engage armature winding lead wires 16. In the assembly shown in FIGS. 1 and 2, a cover 27 engages the base member 1 and encloses the terminals 15. Each contact member 3 is formed with four holes 12 and each carbon segment 4 is formed integral with an anchor piece 8 which fills those parts of the slot 5, including the holes 12, not occupied by the contact member 3 disposed within the slot 5.

Figure 4:
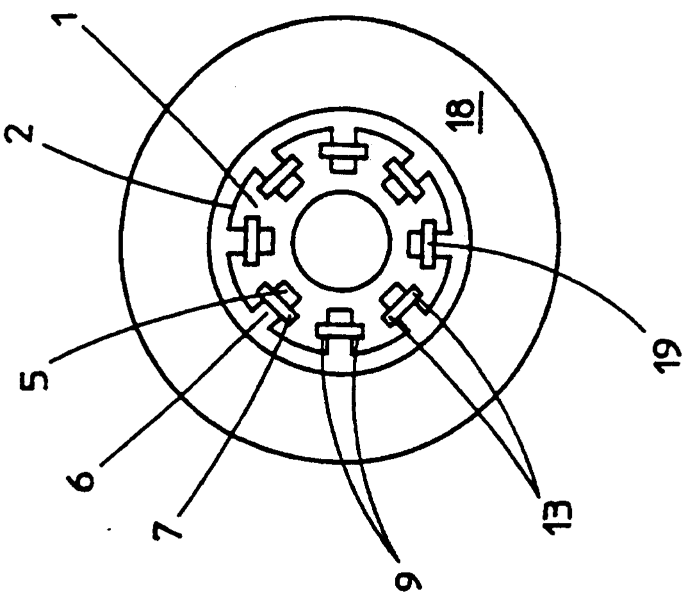
FIGS. 4 and 5 are elevational views of opposite ends of the base member shown in FIG. 3.
Figure 6:
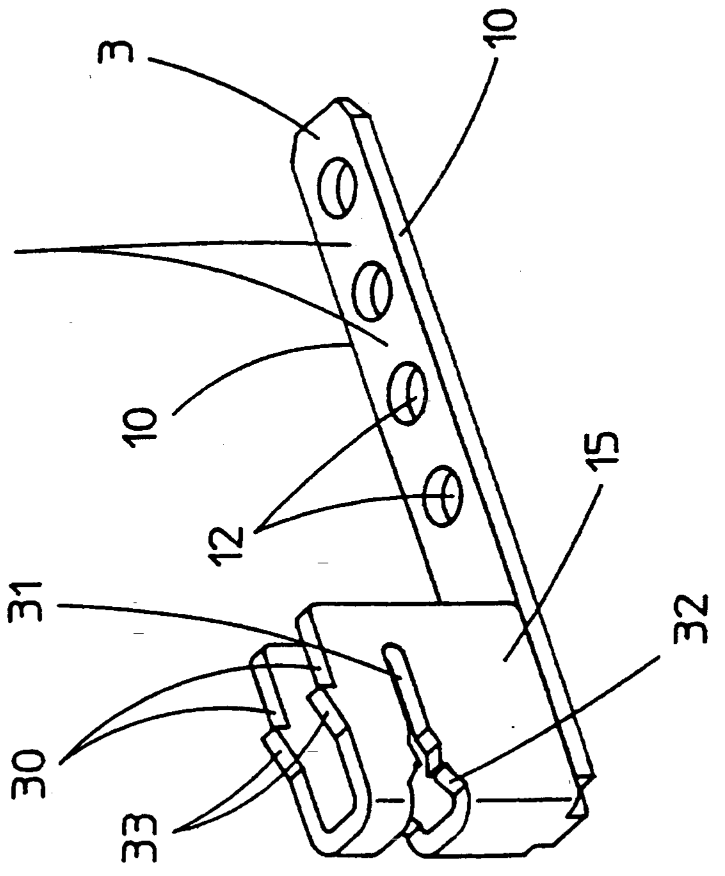
FIG. 6 is an oblique view of a contact member forming part of the commutator shown in FIGS. 1 and 2.

As shown in FIGS. 2 and 4, the slots 5 are cruciform-shape in cross-section and each have a narrower portion 6 and, radially inwards of the narrower portion 6, a broader portion 7 of greater circumferential extent than the narrower portion 6 with two oppositely directed lateral parts 13 for accommodating the lateral edges 10 of the contact members 3 (see FIG. 6). As shown in FIG. 1, the contact members 3 are respectively disposed in the broader portions 7 of the slots 5 and the lateral parts 13 of each broader portion 7 are disposed inwardly of two internal shoulders 9 which provide inwardly facing abutments for the contact member 3 disposed within the broader portion 7.

Figure 5:
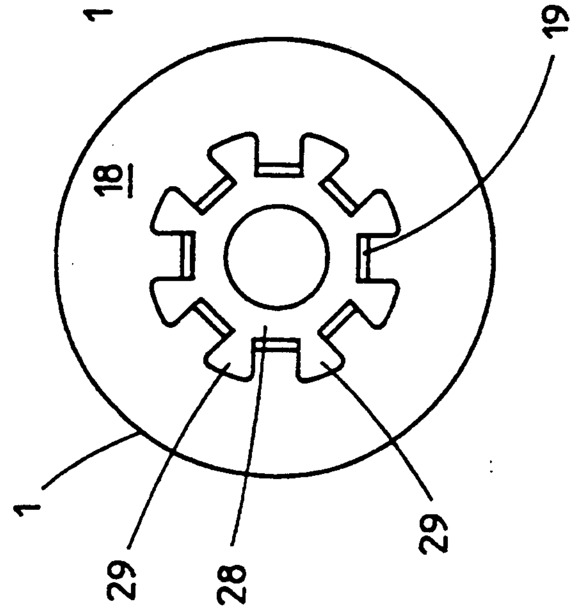

As shown in FIG. 5, the base member 1 is provided with a hub 28 on the opposite side of the annular radial extension 18 to the axially extending outer surface This hub 28 is provided with radially extending abutments 29, between apertures 19 formed in the annular radial extension 18, to provide lateral support for the terminals 15 provided as parts of the contact members 3.

As shown in FIG. 6, each elongate contact member 3 has lateral edges 10 on opposite sides of a central part 11 in which the holes 12 are formed and a terminal 15 having two laterally-spaced, slotted side portions 30 for receiving the armature winding lead wire 16. Each side portion 30 is formed with a slot 31 having a convergent mouth 32 and is shaped to strip insulation material on the wire 16 so that wire 16 makes good electrical contact with the terminal 15 when it is within the slot 31. Spurs 33 on the upper edge of each side portion 30 engage the cover 27, as shown in FIG. 1, to secure the cover 27 in place.

Figure 7:
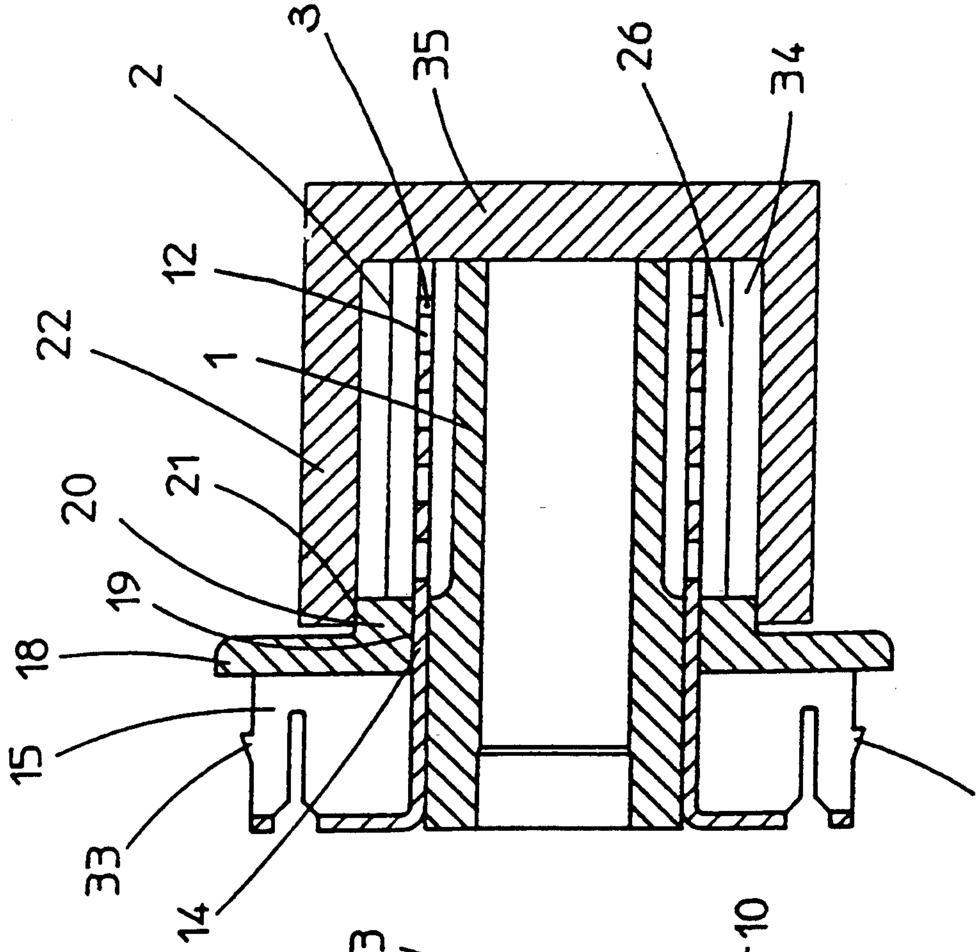
FIG. 7 is a sectional side elevation of an assembly comprising a base member and contact members forming parts of the commutator shown in FIGS. 1 and 2, together with a mould for use in producing a commutator in accordance with the invention.

In the production of carbon segment commutators, according to the invention, the base member 1 and contact members 3 as constructed are hereinbefore described and then assembled, as shown in FIG. 7, with the contact members extending through the apertures 19 formed in the annular radial extension 18. A circular section mould 22 is then fitted around the base member 1 and the contact members 3 so as to provide a sealed space 26 between the mould 22 and the assembly of base member 1 and contact members 3. A mouldable mixture of carbon powder and carrier material, such as phenolic resin, is then injected into the space 26 through apertures (not shown) in the mould 22. This mouldable mixture flows into the cruciform-section slots 5 and passes through holes 12 formed in the contact members 3 to ensure that the mouldable material fills those parts of the slots 5 which are not occupied by the contact members 3. The space 26 also includes an annular-section portion 34 between the outer surface 2 of the base member 1 and the mould 22 to form a circumferential layer of carbon having an outer, annular-section portion similar to the annular-section portion 24 shown in FIG. 4, prior to formation of the carbon segments 4, as shown in FIG. 2.

To ensure that the mould 22 seals the space 2, the annular radial extension 18 is provided with a coaxial annular projection 20 having a cylindrical surface 21 which is a tight fit with the internal surface of the mould 22. The length of the mould 22 and the project,on 20 are such that the base 35 of the mould 22 can be pressed into sealing engagement with the adjacent end of the base member 1.

After the space 26 has been filled with mouldable mixture and this mouldable mixture has solidified, and alter any necessary processing or heat treatment of the moldable mixture has taken place, the mould 27 is removed and a cutting tool is used to form axial cuts 25 in the curer, annular-section portion of the injection moulded layer so as to divide the outer, annular-section portion into a plurality of carbon segments 4 which are each integrally formed with anchor pieces 8 which fill those parts of the slots 5 which are unoccupied by the contact member 3. As shown in FIG. 2, the axially extending cuts 25 pass through the outer, annular-section portion of the injection moulded layer into the underlying base member 1.

Figure 8:
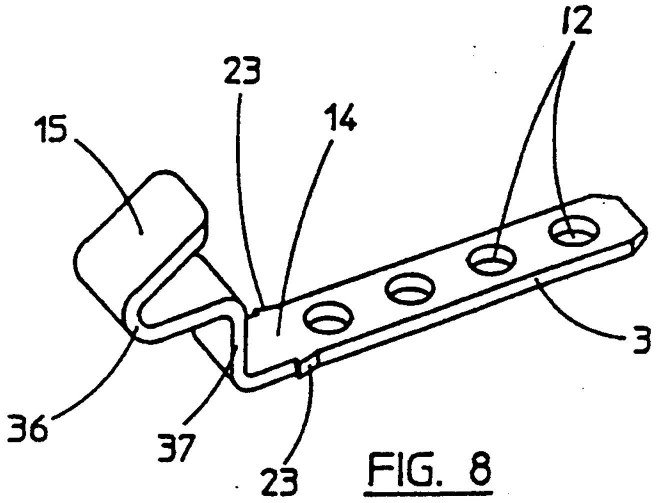
FIG. 8 is an oblique view of a contact member forming part of a second commutator according to the invention.
Figure 9:
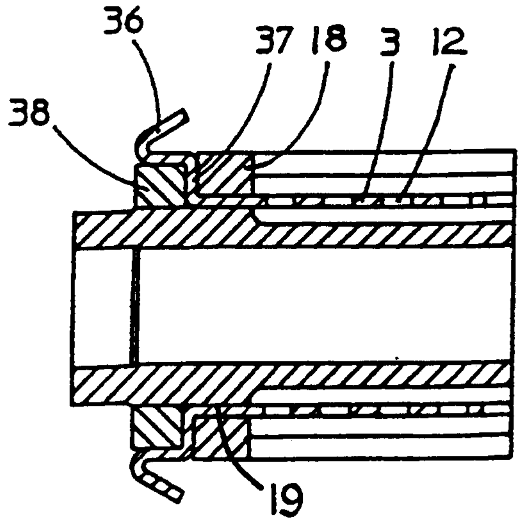
FIG. 9 is a sectional side elevation of an assembly, prior to injection moulding, forming part of a second commutator according to the invention.
Figure 10:
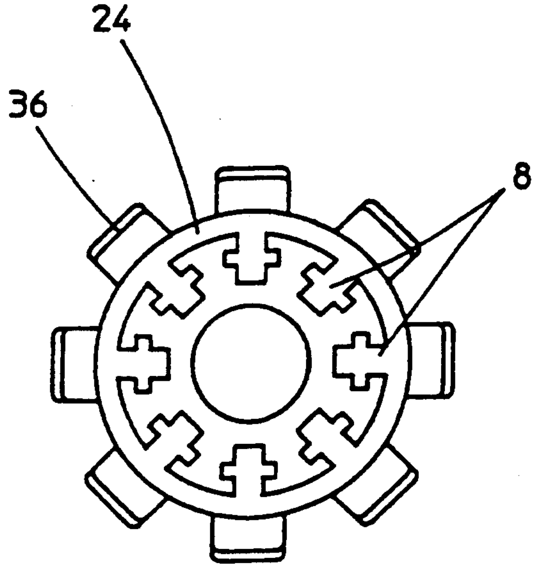
FIG. 10 is an end elevation of an assembly, similar the assembly shown in FIG. 9, but after injection moulding has taken place.

In the second embodiment of the invention shown in FIGS. 8 to 10, the contact members 3 are also formed with four holes 12 and with terminals 15. However, in this case, the terminals 15 comprise "U"-shaped portions 36, for clamping armature winding lead wires 16, and upstanding portions 37 extending from the ends 14 which pass through the apertures 19 in the annular radial extension 18 of the base member 1.

As shown in FIG. 8, the end 14 of each contact member of the second embodiment, which extends through an aperture 19 in the annular radial extension 18 is formed with two spurs 23 which engage the sides of the aperture 19 and serve both to resist withdrawal of the contact member 3 from the aperture 19 and as sealing means to prevent injection moulded material from flowing the aperture 19 towards the terminal 15.

As shown in FIG. 9, a ring 38 of phenolic resin is mounted on the base member 1 so as to provide a longitudinal abutment for the contact members 3 and to hold the upstanding portions 37 against the annular radial extension 18. The ring 38 also provides a heat resistant radial support for the "U"-shaped portions 36 of the terminal 15 so as to permit the portions 36 to be clamped around armature winding lead wires 16 in hot staking operations.

As shown in FIG. 10, when the injection moulding operation is completed, the base member 1 is enclosed in an injection moulded layer comprising an outer, annular-section portion 24 and integral anchor pieces 8.

What is claimed is:

1. A cylindrical carbon segment commutator, for an electric motor, comprising:

a base member, of insulating material, having an axially-extending outer surface formed with a plurality of axially-extending, slots each having a radial axis, a narrower portion and, radially inwards of the narrower portion, a broader portion of greater circumferential extent than the narrower portion:

a plurality of axially-extending contact members respectively disposed within the slots; and a plurality of overmoulded carbon segments formed integral with anchor pieces which are respectively disposed within the slots and fill those parts of the slots which are not occupied by the contact members disposed within the slots so as to be respectively connected to the contact members and held in fixed relation to the base member.

2. A commutator, according to claim 1, in which:

the broader portion of each slot has two internal shoulders respectively disposed on opposite sides of the radial axis of the slot;

each contact member has two lateral edge parts and a central part, between the lateral edge parts, formed with at least one hole; and the contact members are respectively disposed within the broader portions of the slots with the two lateral edge parts of each contact member in radial abutment with the two internal shoulders of the slot in which the contact member is disposed.

3. A commutator, according to claim 2, in which the two internal shoulders comprise radially inwardly facing abutments, perpendicular to said radial axis.

4. A commutator, according to claim 3, in which the internally-shouldered slots are cruciform-section slots, and each slot has two lateral parts which respectively accommodate the lateral edge parts of the contact member disposed within the slot to thereby radially locate the contact member.

5. A commutator, according to claim 1, in which each contact member is provided at one end with a terminal for connection to an armature winding lead wire.

6. A commutator, according to claim 1, in which each slot has one end which is longitudinally adjacent one end of each other slot; the base member is formed with an annular radial extension, at least at said one end of each slot; each radial extension is formed with axially extending apertures respectively aligned with the slots formed in the axially extending outer surface of the base member; and the contact members disposed in the slots extend through the apertures.

7. A commutator, according to claim 6, in which each contact member, has one end which extends through one of the apertures and is provided with a terminal for connection to an armature winding lead wire.

8. A commutator, according to claim 6, in which the base member is provided with an annular radial extension at said one end of each slot; and the annular radial extension is provided with a coaxial annular projection having a cylindrical surface for sealing engagement within a circular section mould surrounding the outer surface.

9. A commutator, according to claim 7, in which the base member is provided with one annular radial extension, at said one end of each slot; and sealing means are provided to seal between the apertures formed in the annular radial extension and the ends of the contact members which extend through said apertures.

10. A cylindrical carbon segment commutator, for an electric motor comprising:

a base member, of insulating material, having an axially-extending outer surface;

a plurality of axially-extending, internally-shouldered cruciform-section slots formed in the outer surface of the base member and each having:

a radial axis;

a narrower portion;

a broader portion, radially inwards of the narrower portion, of greater circumferential extent than the narrower portion;

two lateral parts of said broader portion respectively disposed on opposite sides of the radial axis;

two radially inwardly facing abutments respectively provided by said two lateral parts of said broader portion, perpendicular to said radial axis, forming two internal shoulders: and one end which is longitudinally adjacent one end of each other slot.

an annular radial extension projecting from the base member at said one end of each slot and formed with axially extending apertures respectively aligned with the slots;

a coaxial annular projection on said annular radial extension having a cylindrical surface for sealing engagement within a circular section mould surrounding the outer surface;

a plurality of elongate, axially-extending contact members respectively disposed within the broader portions of the cruciform-section slots and each having:

one end which extends through one of the axially extending apertures in the annular radial extension projecting from the base member;

two lateral edge parts respectively disposed in radial abutment with the two internal shoulders, within the two lateral parts of the slot in which the contact member is disposed to thereby radially locate the contact member;

a central part, between the lateral edge parts, formed with at least one hole: and sealing means respectively provided on the two lateral edge parts to seal between the aperture in the annular radial extension and said one end of the contact member extending through said aperture; and a plurality of overmoulded carbon segments formed integral with anchor pieces which are respectively disposed within the slots and fill those parts of the slots which are not occupied by the contact members disposed within the slots.

* * * * *